Patented Sept. 7, 1954

2,688,591

UNITED STATES PATENT OFFICE 2,688,591

PURIFICATION OF OXO-PROCESS ALDEHYDES BY DISTILLATION

Robert H. Hill, Columbus, Ohio, assignor to Standard Oil Company, Chicago, Ill., a corporation of Indiana No Drawing. Application May 6, 1950,
Serial No. 160,575

9 Claims. (Cl. 202—57)

This invention relates to the purification of crude aldehyde mixtures obtained by the reaction of olefins with carbon monoxide and hydrogen in the Oxo Process. More particularly, it relates to an improved method for separating unreacted olefins from crude Oxo-Process aldehydes and for recovery of said aldehydes in purified form, without substantial losses through degradation or side reactions thereof.

The Oxo Process, as ordinarily practiced, comprises two basic operations: (1) An organic compound containing at least one olefinic or acetylenic linkage is formylated by reaction in the presence of a cobalt catalyst at a temperature between about 100 and 300° C. and a pressure between about 50 and 300 atmospheres with a mixture of carbon monoxide and hydrogen having a molar ratio between about 2:1 and about 0.5:1. (2) The resulting aldehyde product is hydrogenated to the corresponding alcohols, using any of the well-known hydrogenation catalysts under conventional conditions, suitably cobalt on pumice at 175 to 300° C. and 500 to 1500 pounds per square inch. The respective reactions of a simple charging stock (wherein R represents an organic radical) are as follows:

(1) $R-CH=CH_2 + CO + H_2 \longrightarrow R-CH_2-CH_2-CHO$ and

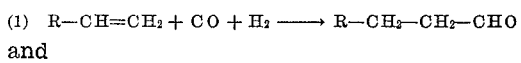

(2a) $R-CH_2-CH_2-CHO + H_2 \longrightarrow R-CH_2-CH_2-CH_2OH$ (2b) 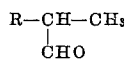 $+ H_2 \longrightarrow$ 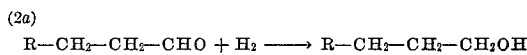

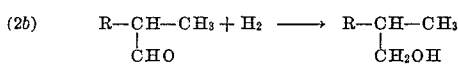

The crude aldehyde mixture obtained in Step (1) is ordinarily subjected to the hydrogenation Step (2) or to other conversion steps without any intervening purification steps, with the possible exception of an acid wash to remove dissolved or suspended cobalt and/or a gas purge to remove dissolved carbon monoxide. In many cases, however, purification of the crude aldehyde mixture is desirable or essential before subsequent treatment thereof. For example, it is desirable to remove the unreacted olefin prior to the hydrogenation step, since otherwise the olefin would become saturated and could not be recycled. It is also desirable to remove from the crude aldehyde mixture the higher-boiling degradation products thereof, since these materials greatly reduce the effective life of the catalyst used in the subsequent hydrogenation step. Moreover, various other impurities of uncertain nature and origin in the crude aldehyde mixture should preferably be removed in order to avoid rapid deactivation of the hydrogenation catalyst. When it is desired to oxidize the aldehydes to the corresponding carboxylic acids by treatment with oxygen, by air-blowing, or the like, the unreacted olefins should first be removed, since they have been found to have a strong inhibiting effect on the oxidation reaction.

According to the prior art, however, and according to my own experience, the removal of impurities from the crude aldehyde mixture is very difficult, and the isolation of the aldehydes in good yield by conventional methods is impossible. Fractional distillation, even at low pressures, results in substantial losses of the aldehydes through degradation reactions, and steam distillation produces a distillate fraction of low purity and bad color.

I have now discovered that crude Oxo-process aldehydes can be purified and isolated in good yield by steam-distillation at a pH above about 5 in the absence of free strong base and in the presence of water and a water-soluble salt derived from an acid containing at least one ionizable hydrogen atom having a dissociation constant at 25° C. smaller than about $10^{-3}$.

One object of my invention is to purify Oxo-process aldehydes. Another object is to separate unreacted olefins therefrom without substantial degradation of the aldehydes. A further object is to remove hydrogenation-catalyst poisons from crude Oxo-process aldehydes. A still further object is to remove oxidation inhibitors from crude Oxo-process aldehydes. Another object is to isolate aldehydes in high purity and in good yield from the product of the formylation step of the Oxo-process. Other objects of my invention and its advantages over the prior art will be apparent from the present description and the appended claims.

The basis for the success of my new process is obscure. The crude Oxo formylation product is always acidic in nature, ordinarily having a pH between about 3 and 4. This condition may be due to the presence therein of a quantity of cobalt hydrocarbonyl, derived from the formylation catalyst, or to other acidic by-products of unknown composition. In my new process, these materials may react with, or otherwise be destroyed by, the salt which I add to the crude aldehyde mixture before steam-distilling, and which may be defined broadly as a buffering agent. In this way, the tendency of the aldehydes in the charging stock to polymerize, condense, undergo acetal formation, or otherwise become degraded may be nullified, and the effect of any hydrogenation-inhibiting or oxidation-inhibiting material therein may be counterbalanced. The observed effect does not appear to be primarily a result of pH conditions, since at high pH levels my additives give excellent results, whereas free strong bases having substantially the same pH cause extensive degradation and loss of aldehydes. It is to be understood, however, that the foregoing theory of the mode of operation of my process is advanced only as a plausible explanation thereof, and I do not wish to be bound thereby.

My process may be carried out in a variety of ways. In a simple embodiment, an aqueous solution containing an additive of my defined class of salts is introduced into a distillation vessel with a quantity of crude Oxo-process aldehydes. The quantity of aqueous phase is not critical, but should preferably be maintained at a substantial level (for example, at least about one-fifth the volume of the organic charging-stock phase) during the ensuing steam-distillation. The quantity of salt additive is also not critical, but should comprise at least about one percent by weight of the crude aldehyde phase, and should preferably constitute between about 2 and 10 percent by weight thereof. A stoichiometric quantity of a free base, sodium carbonate, sodium bicarbonate, or the like may be employed to neutralize any free acidity in the crude aldehyde mixture. Steam distillation is then carried out in a conventional manner, preferably at ordinary or somewhat reduced pressure, either by introducing steam directly into the distillation charge, or by supplying heat thereto and boiling the water-containing mixture. Makeup water may be added as desired, preferably at the boiling point, to maintain the water content of the distillation vessel at the desired level. The vapors from the distillation vessel are preferably led into a fractionating column of conventional design, equipped with a condenser, decanter and/or reflux drum, and suitable control apparatus. The distillate water phase may conveniently and desirably be refluxed to the top of the fractionating column, where it serves as an extractive distillation agent, improving the separation between the relatively water-soluble aldehydes and the relatively water-insoluble unreacted olefins. In such case, it is desirable to incorporate a water trap-out plate at a lower point in the fractionating column in order to avoid undesirably large accumulations of water within the system. The initial distillate fraction consists essentially of unreacted olefins, water, and ordinarily a small proportion of aldehydes. After the olefin fraction has been withdrawn, the organic material remaining in the distillation vessel consists essentially of the Oxo-process aldehydes and higher-boiling condensation products. This material is suitable for oxidation to the corresponding carboxylic acids. If, however, it is desired to hydrogenate the aldehydes to the corresponding alcohols, then the distillation should be continued, and the aldehydes should be withdrawn as a distillate fraction, the distillate water fraction being simultaneously refluxed or withdrawn as desired. After the aldehydes have been withdrawn, the residue remaining in the distillation vessel is a mixture of water, the salt employed as a treating agent, and a high-boiling organic fraction from the charging stock ("Oxo bottoms"), containing the high-boiling impurities originally present therein. The aqueous salt phase may be separated and recycled, if desired, to the distillation of another batch of formylation product, after appropriate adjustment of pH and addition of makeup salt or water as required.

In another embodiment of my invention, the charging stock is flash-distilled from a large body of aqueous salt solution, as defined above, in a distillation vessel. The charging stock is preferably introduced therein at such a rate as to prevent the accumulation within the distillation zone of the components of the charging stock that are steam-distillable under the conditions employed. This technique has the advantages that the olefins and aldehydes are separated almost instantaneously from any impurities which might cause them to become degraded, and they are exposed for the absolute minimum of time to elevated temperatures at which they tend to undergo undesirable side-reactions. Furthermore, the distillate, being free from acids and other impurities, can be fractionally redistilled to separate the olefins from the aldehydes, preferably in the presence of my aqueous salt solution, without undergoing degradation.

My process can be carried out batchwise, continuously, or semi-continuously, employing in each case the appropriate distillation equipment of conventional design.

In purifying a crude olefin formylation product according to my new process, I employ an aqueous solution having a pH above about 5, ordinarily between about 5 and 9, and preferably between about 6 and 8, of a water-soluble salt derived from an acid containing at least one ionizable hydrogen atom having a dissociation constant at 25° C. smaller than $10^{-3}$. So far as I have been able to determine, substantially any pH above about 5 is operative in my process, but the distillation must be carried out substantially in the absence of free strong bases, such as sodium hydroxide, potassium hydroxide, tetramethylammonium hydroxide, and the like. The cation constituent of the salt is unimportant, so long as the salt is substantially water-soluble. Suitable salts include the borates, bromoacetates, acetates, carbonates, chloroacetates, citrates, oxalates, phosphates, pyrophosphates, sulfites, and the like, of sodium, potassium, lithium, and (where substantially water-soluble) of calcium, magnesium, strontium, and the like.

My process is suitable broadly for purifying crude formylation products obtained in the Oxo process, whether containing unreacted olefins or not. Suitable charging stocks include butyraldehydes, derived from propylene; valeraldehydes from butylenes; hexaldehydes from pentenes; margaric aldehyde from cetene; 3,5,5-trimethyl-1-hexanal from diisobutylene; octyl aldehydes from propylene-butylene interpolymers; nonyl aldehydes from n-butylene-isobutylene codimer; 3-hydroxybutyraldehyde from allyl alcohol; 3-acetoxybutyraldehyde from allyl acetate; mixed aldehydes from olefins synthesized by reacting carbon monoxide with hydrogen; aldehydes derived from acetylene and from substituted acetylenes; and a wide variety of others, within the broad scope of the definition set forth above.

It has been found that the steam distillation technique of my invention permits the substantially complete recovery of unreacted olefins and of aldehydes from the Oxo-process formylation product. The recovered aldehydes are readily oxidized by air-blowing to carboxylic acids of good color and odor; and when the recovered aldehydes are catalytically hydrogenated, the hydrogenation catalyst has an active life up to twenty times as long as catalysts used in hydrogenating unpurified formylation product.

My invention will be more fully understood from the following specific examples.

*Example I*

Crude formylation product measuring 1173 grams, obtained by treating n-butylene-isobutylene codimer with hydrogen and carbon monoxide under Oxo process conditions, and containing 245 grams of nonyl aldehydes, was steam-distilled through a fractionating column. After the unreacted codimer had been withdrawn overhead, the aldehydes began to distill as a heavy, viscous, brown material. At this point, 270 grams of aqueous 8 percent sodium carbonate solution were added to the distillation vessel. Thereafter, the aldehydes distilled as a clear, water-white material.

*Example II*

Into a distillation vessel were introduced 390 grams of a crude formylation product of n-butylene-isobutylene codimer and 100 milliliters of aqueous 10 percent sodium bicarbonate. Free steam was then fed into the distillation vessel in a conventional manner, and the resulting vapors were fractionally distilled at a 1:1 reflux ratio through a column packed with glass helices. At the end of six hours, all of the unreacted codimer had been removed from the distillation vessel. The distillation was stopped at this point, and the residual sodium bicarbonate solution was withdrawn. The distillate and organic distillation bottoms, on being measured and analyzed, were found to contain respectively 45.5 grams and 80.6 grams of aldehydes, corresponding to 35 percent and 62 percent of the aldehydes in the distillation charge, and a total recovery of 97 percent.

Oxidation of the distillation bottoms gave a water-white acid mixture which analyzed 93 percent nonanoic acid.

*Example III*

A crude n-butylene-isobutylene codimer formylation product (196 grams) analyzing 21 percent by weight nonyl aldehydes was mixed with aqueous 10 percent sodium bicarbonate solution (100 milliliters) and the mixture was steam-distilled over a period of five hours from a distillation vessel through a Stedman column at a reflux ratio of 1:1. The unreacted codimer and the mixed aldehydes were removed as successive distillate fractions, the latter at a top-of-column temperature between 208 and 232° F. On analysis, the aldehyde content of the various fractions was found to be as follows:

|  | Weight | Recovered |
|---|---|---|
|  | *Grams* | *Percent* |
| Codimer distillate | 7.4 | 18 |
| Aldehyde distillate | 32.2 | 78 |
| Bottoms | 2.5 | 6 |

Oxidation of the aldehyde distillate fraction produced a water-white nonanoic-acid mixture.

*Example IV*

A 300-gram portion of crude formylation product of n-butyleneisobutylene codimer containing 53.3 percent aldehydes was steam-distilled in the presence of 500 grams of aqueous two percent sodium bicarbonate through a Vigreux column measuring 0.8 inches in diameter and 16 inches in length. Distillation was continued until most of the aldehyde had been taken overhead. The results were as follows:

| | Top Column Temp., °C. | Distillate Wt. | | Aldehyde Analysis | |
|---|---|---|---|---|---|
| | | Water, g. | Oil, g. | Conc'n. wt.-percent | Wt., g. |
| Fraction No.: | | | | | |
| 1 | 73–83 | 7 | 64.5 | 2.84 | 1.8 |
| 2 | 83–95.5 | 16 | 26 | 49.5 | 12.9 |
| 3 | 95.5–95.8 | 10 | 7.5 | 86.5 | 6.5 |
| 4 | 95.8–96.2 | 50 | 39.5 | 89.5 | 35.4 |
| 5 | 96.2–96.7 | 54 | 38.5 | 90.9 | 35.0 |
| 6 | 96.7–97.0 | 45.5 | 28 | 86.0 | 24.1 |
| 7 | 97.0–98.2 | 71 | 26 | 70.4 | 18.3 |
| 8 | 98.2–98.8 | 90.5 | 11 | 45.0 | 5.0 |
| Bottoms | | 154 | 50 | 16.4 | 8.2 |
| Total | | | | | 147.2 |

The loss of aldehydes amounted to 12.5 grams, corresponding to 7.8 percent by weight of the aldehydes charged.

*Example V*

Crude formylation product of n-butylene-isobutylene codimer (394 grams) containing 150 grams of nonyl aldehydes was steam-distilled over a period of three hours in the presence of aqueous 0.5 N sodium acetate solution (250 ml) having a pH of 7.7. The codimer was withdrawn overhead, leaving the aldehydes in the distillation bottoms. Analyses of distillate and bottoms showed a recovery of 151 grams of aldehydes. Upon oxidation of the bottoms, a water-white nonanoic acid mixture was produced, free from malodorous materials.

*Example VI*

Crude formylation product of n-butylene-isobutylene codimer (400 grams) containing 152 grams of nonyl aldehydes was commingled with 250 milliliters of aqueous 0.4 N trisodium phosphate buffer solution having a pH of 11.1. The codimer contained in the formylation product was steam-distilled overhead over a period of seven and a quarter hours, and the aldehydes were left behind in the distillation bottoms. The recovered materials, distillate plus bottoms, contained 148 grams of nonyl aldehydes, corresponding to 97.3 percent of the aldehydes charged.

While I have described my invention in connection with certain specific embodiments thereof, it is to be understood that I am not limited thereto, but may employ any of the charging stocks, buffering additives, or manipulative procedures within the broad definitions set forth In accordance with the foregoing description, I claim as my invention:

1. In a process for purifying a crude olefin formylation product obtained by means of the Oxo process, said crude olefin formylation product containing aldehydes and unreacted olefins, together with acidic by-products of said Oxo process normally having a detrimental effect upon the further treatment of aldehydes contained in said product, the steps which comprise commingling said crude olefin formylation product with water and a buffering quantity of a neutral, water-soluble salt derived from an acid containing at least one ionizable hydrogen atom having a dissociation constant at 25° C. smaller than about $10^{-3}$, steam-distilling the resulting mixture at a pH above about 5 in the absence of free strong base, and withdrawing unreacted olefins and purified aldehydes therefrom as a distillate stream.

2. The process of claim 1 wherein said salt is sodium bicarbonate.

3. The process of claim 1 wherein said salt is sodium acetate.

4. The process of claim 1 wherein said salt is sodium phosphate.

5. In a process for purifying a crude olefin formylation product obtained by means of the Oxo process, said crude olefin formylation product containing aldehydes and unreacted olefins, together with acidic by-products of said Oxo process normally having a detrimental effect upon the further treatment of aldehydes contained in said product, the steps which comprise commingling said crude olefin formylation product with water and between about 1 and 10 percent by weight, based on said formylation product, of a neutral water-soluble salt derived from an acid containing at least one ionizable hydrogen atom having a dissociation constant at 25° C. smaller than about $10^{-3}$, steam-distilling the resulting mixture at a pH above about 5 in the absence of free strong base, and successively withdrawing therefrom an unreacted olefin distillate fraction and a purified aldehyde distillate fraction.

6. In a process for purifying a crude olefin formylation product obtained by means of the Oxo process, said crude olefin formylation product containing aldehydes and unreacted olefins, together with acidic by-products of said Oxo process normally having a detrimental effect upon the further treatment of aldehydes contained in said product, the steps which comprise commingling said crude olefin formylation product with water and a buffering quantity of a neutral, water-soluble salt derived from an acid containing at least one ionizable hydrogen atom having a dissociation constant at 25° C. smaller than about $10^{-3}$, steam-distilling the resulting mixture at a pH between about 5 and 9, and withdrawing unreacted olefins and purified aldehydes therefrom as distillate fractions.

7. In a process for purifying a crude olefin formylation product obtained by means of the Oxo process, said crude olefin formylation product containing aldehydes and unreacted olefins, together with acidic by-products of said Oxo process normally having a detrimental effect upon the further treatment of aldehydes contained in said product, the steps which comprise commingling said crude olefin formylation product with water and a buffering quantity of a neutral, water-soluble salt derived from an acid containing at least one ionizable hydrogen atom having a dissociation constant at 25° C. smaller than about $10^{-3}$, steam-distilling the resulting mixture at a pH between about 6 and 8, and withdrawing therefrom unreacted olefins and purified aldehydes in high yield as distillate fractions.

8. In a process for purifying crude Oxo process formylation product derived from n-butylene-isobutylene codimer, said crude formylation product containing nonyl aldehydes and unreacted codimer, together with acidic by-products of said Oxo process normally having a detrimental effect upon the further treatment of aldehydes contained in said product, the steps which comprise commingling said crude formylation product with water and a buffering quantity of a neutral, water-soluble salt derived from an acid containing at least one ionizable hydrogen atom having a dissociation constant at 25° C. smaller than about $10^{-3}$, steam-distilling the resulting mixture at a pH above about 5 in the absence of free strong base, and successively withdrawing therefrom an unreacted codimer distillate fraction and a nonyl aldehyde distillate fraction.

9. In a process for purifying a crude Oxo process formylation product derived from a propylene-butylene interpolymer, said crude formylation product containing octyl aldehydes and unreacted interpolymer, together with acidic by-products of said Oxo process normally having a detrimental effect upon the further treatment of aldehyde contained in said product, the steps which comprise commingling said crude formylation product with water and a buffering quantity of a neutral water-soluble salt derived from an acid containing at least one ionizable hydrogen atom having a dissociation constant at 25° C. smaller than about $10^{-3}$, steam-distilling the resulting mixture at a pH above about 5 in the absence of free strong base, and successively withdrawing therefrom an unreacted interpolymer distillate fraction and an octyl aldehyde distillate fraction.

References Cited in the file of this patent

UNITED STATES PATENTS

| Number | Name | Date |
|---|---|---|
| 2,252,117 | Conover | Aug. 12, 1941 |
| 2,442,942 | Tuerck et al. | June 8, 1948 |
| 2,500,894 | Craig | Mar. 14, 1950 |
| 2,514,961 | Max | July 11, 1950 |
| 2,544,562 | Michael | Mar. 6, 1951 |
| 2,576,113 | Hagemeyer | Nov. 27, 1951 |

FOREIGN PATENTS

| Number | Country | Date |
|---|---|---|
| 600,525 | Great Britain | Apr. 12, 1948 |

OTHER REFERENCES

MacDougall: "Physical Chemistry," page 522 (1947), The Macmillan Co., New York, N. Y.

Ser. No. 353,384, Conradi et al. (A. P. C.), published Apr. 20, 1943.